United States Patent
Nakagawa et al.

(10) Patent No.: US 10,570,584 B2
(45) Date of Patent: Feb. 25, 2020

(54) WORK MACHINE AND METHOD FOR CONTROLLING WORK MACHINE

(71) Applicant: Kubota Corporation, Osaka-shi (JP)

(72) Inventors: Hiroaki Nakagawa, Sakai (JP); Masahiro Kuroda, Sakai (JP); Masahiko Nomura, Sakai (JP); Shinichi Kawabata, Sakai (JP); Yuki Shimoike, Sakai (JP); Shizuo Demizu, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 288 days.

(21) Appl. No.: 15/624,720

(22) Filed: Jun. 16, 2017

(65) Prior Publication Data
US 2017/0362799 A1 Dec. 21, 2017

(30) Foreign Application Priority Data
Jun. 21, 2016 (JP) .................. 2016-122777

(51) Int. Cl.
  *E02F 9/20* (2006.01)
  *B60K 6/48* (2007.10)
  (Continued)

(52) U.S. Cl.
  CPC ............ *E02F 9/2075* (2013.01); *B60K 6/48* (2013.01); *B60W 20/10* (2013.01); *B60W 20/40* (2013.01);
  (Continued)

(58) Field of Classification Search
  CPC ............ Y02T 10/6221; Y10S 903/903; E02F 9/2075; E02F 9/267; E02F 3/3414;
  (Continued)

(56) References Cited

U.S. PATENT DOCUMENTS

| | | | | |
|---|---|---|---|---|
| 6,104,166 A | * | 8/2000 | Kikuchi | B60K 6/365 320/132 |
| 6,232,748 B1 | * | 5/2001 | Kinoshita | B60K 6/485 320/132 |

(Continued)

FOREIGN PATENT DOCUMENTS

| | | | | |
|---|---|---|---|---|
| DE | 102014223891 A1 | * | 5/2016 | ....... F02M 35/10255 |
| DE | 102014224474 A1 | * | 6/2016 | .............. F02B 37/04 |

(Continued)

OTHER PUBLICATIONS

Japanese Office Action for corresponding JP Application No. 2016-122777, dated Mar. 11, 2019 (w/ machine translation).

(Continued)

*Primary Examiner* — Tuan C To
(74) *Attorney, Agent, or Firm* — Mori & Ward, LLP

(57) ABSTRACT

A work machine includes an engine, a motor-generator, a battery, a power detector, a temperature detector, and circuitry. The engine is to move the work machine. The motor-generator is to move the work machine and to generate electric power. The battery is to store the electric power generated by the motor-generator. The power detector is to detect a charge level of the electric power stored in the battery. The temperature detector is to detect a temperature of the battery. The circuitry is configured to control the motor-generator in accordance with the charge level selectively to move the work machine or to generate electric power when the temperature of the battery detected by the temperature detector is within a temperature range.

7 Claims, 10 Drawing Sheets

(51) Int. Cl.
*B60W 20/40* (2016.01)
*B60W 20/10* (2016.01)
*E02F 9/26* (2006.01)
*E02F 3/34* (2006.01)

(52) U.S. Cl.
CPC . *B60W 2300/17* (2013.01); *B60W 2510/0638* (2013.01); *B60W 2510/244* (2013.01); *B60W 2510/246* (2013.01); *B60W 2710/06* (2013.01); *B60W 2710/08* (2013.01); *B60Y 2200/415* (2013.01); *E02F 3/3414* (2013.01); *E02F 9/267* (2013.01); *Y02T 10/6221* (2013.01); *Y10S 903/903* (2013.01)

(58) Field of Classification Search
CPC ......... B60K 6/48; B60W 20/10; B60W 20/40; B60W 2300/17; B60W 2510/0638; B60W 2510/244; B60W 2510/246; B60W 2710/08; B60W 2710/06; B60Y 2200/415
USPC .......................................................... 701/22
See application file for complete search history.

(56) References Cited

U.S. PATENT DOCUMENTS

| | | | |
|---|---|---|---|
| 8,634,977 B2 | 1/2014 | Koide | |
| 9,227,626 B2* | 1/2016 | Pandit | B60K 1/00 |
| 9,764,633 B1* | 9/2017 | Dorothy | B60L 50/10 |
| 9,878,616 B2* | 1/2018 | Dalum | B60K 25/00 |
| 2002/0055810 A1* | 5/2002 | Nakasako | B60K 6/48 |
| | | | 701/22 |
| 2006/0033469 A1* | 2/2006 | Beaty | B60L 3/0046 |
| | | | 320/104 |
| 2007/0007056 A1* | 1/2007 | Bowers | B60K 6/48 |
| | | | 180/65.23 |
| 2009/0288896 A1* | 11/2009 | Ichikawa | B60L 58/24 |
| | | | 180/65.265 |
| 2010/0185405 A1* | 7/2010 | Aoshima | B60L 3/0046 |
| | | | 702/63 |
| 2013/0190958 A1* | 7/2013 | Izumi | B60W 20/20 |
| | | | 701/22 |
| 2013/0221751 A1 | 8/2013 | Miyakawa et al. | |
| 2013/0297129 A1* | 11/2013 | Ang | B60K 6/445 |
| | | | 701/22 |
| 2014/0350764 A1* | 11/2014 | Arai | B60W 40/10 |
| | | | 701/22 |
| 2015/0122203 A1* | 5/2015 | Ideshio | B60K 6/48 |
| | | | 123/2 |
| 2015/0291145 A1* | 10/2015 | Yu | B60W 10/06 |
| | | | 701/22 |
| 2015/0291175 A1* | 10/2015 | Harada | B60K 6/445 |
| | | | 701/22 |
| 2016/0186644 A1* | 6/2016 | Murata | F01P 7/026 |
| | | | 454/75 |
| 2017/0096136 A1* | 4/2017 | Nawata | B60K 6/445 |
| 2017/0101023 A1* | 4/2017 | Nawata | B60L 1/006 |
| 2017/0282894 A1* | 10/2017 | Kamachi | B60W 20/13 |

FOREIGN PATENT DOCUMENTS

| | | |
|---|---|---|
| JP | 4157844 B2 | 7/2008 |
| JP | 4865739 B2 | 8/2009 |
| JP | 4976317 B2 | 8/2009 |
| JP | 2010-59734 | 3/2010 |
| JP | 4941539 B2 | 3/2012 |
| JP | 5764311 B2 | 5/2012 |
| JP | 2014-121951 | 7/2014 |
| JP | 2015-013534 | 1/2015 |
| JP | 2015-206193 | 11/2015 |
| JP | 2016-011603 | 1/2016 |

OTHER PUBLICATIONS

Japanese Office Action for corresponding JP Application No. 2016-122777, dated Jul. 5, 2019 (w/ machine translation).

* cited by examiner

WORK MACHINE AND METHOD FOR CONTROLLING WORK MACHINE

CROSS-REFERENCE TO RELATED APPLICATIONS

The present application claims priority under 35 U. S. C. § 119 to Japanese Patent Application No. 2016-122777, filed Jun. 21, 2016. The contents of this application are incorporated herein by reference in their entirety.

BACKGROUND OF THE INVENTION

Field of the Invention

The present invention relates to a work machine and a method for controlling a work machine.

Discussion of the Background

There has conventionally been known a work machine like a compact track loader disclosed in JP 2010-59734 A. The work machine according to JP 2010-59734 A includes a machine body, an engine provided to the machine body, a hydraulic pump configured to be driven by motive power of the engine, and a work implement provided to the machine body and configured to be actuated by hydraulic oil of the hydraulic pump. Recently developed is a hybrid work machine as disclosed in JP 2015-206193 A, including a motor as well as an engine as power sources configured to actuate a hydraulic pump.

A hybrid work machine at least includes a motor, an inverter configured to control electric power of the motor, and a battery configured to store electric power. A work machine, unlike a motor vehicle, is configured to perform a task. The motor, the inverter, the battery, and the like thus need to be disposed in view of various perspectives, causing a demand for development of new work machines.

SUMMARY OF THE INVENTION

According to one aspect of the present invention, a work machine includes an engine, a motor-generator, a battery, a power detector, a temperature detector, and circuitry. The engine is to move the work machine. The motor-generator is to move the work machine and to generate electric power. The battery is to store the electric power generated by the motor-generator. The power detector is to detect a charge level of the electric power stored in the battery. The temperature detector is to detect a temperature of the battery. The circuitry is configured to control the motor-generator in accordance with the charge level selectively to move the work machine or to generate electric power when the temperature of the battery detected by the temperature detector is within a temperature range.

According to another aspect of the present invention, a work machine includes an engine, a motor-generator, an actual rotational speed detector, and circuitry. The engine is to move the work machine. The motor-generator is to move the work machine and to generate electric power. The actual rotational speed detector is to detect an actual rotational speed of the engine. The circuitry is to control the motor-generator to move the work machine when the actual rotational speed is lower than or equal to a first rotational speed threshold and to generate the electric power when the actual rotational speed exceeds a second rotational speed threshold which is larger than or equal to the first rotational speed threshold.

According to further aspect of the present invention, a work machine includes an engine, a motor-generator, a target rotational speed setting interface, an actual rotational speed detector, and circuitry. The engine is to move the work machine. The motor-generator is to move the work machine and to generate electric power. A target rotational speed of the engine is set via the target rotational speed setting interface. The actual rotational speed detector is to detect an actual rotational speed of the engine. The circuitry is to control the motor-generator to move the work machine when a difference between the actual rotational speed and the target rotational speed is higher than or equal to a difference threshold, and to generate the electric power when the difference between the actual rotational speed and the target rotational speed is lower than the difference threshold.

According to further aspect of the present invention, a method for controlling a work machine includes controlling an engine to move the work machine. A charge level of electric power stored in a battery is detected. A temperature of the battery is detected. A motor-generator is controlled in accordance with the charge level selectively to move the work machine with electric power supplied from the battery or to generate electric power by driving the motor-generator by the engine when the temperature of the battery is within a temperature range.

According to further aspect of the present invention, a method for controlling a work machine includes controlling an engine to move the work machine. An actual rotational speed of the engine is detected. A motor-generator is controlled to move the work machine when the actual rotational speed is lower than or equal to a first rotational speed threshold and to generate the electric power when the actual rotational speed exceeds a second rotational speed threshold which is larger than or equal to the first rotational speed threshold.

According to further aspect of the present invention, a method for controlling a work machine includes controlling an engine to move the work machine. A target rotational speed of the engine is set. An actual rotational speed of the engine is detected. A motor-generator is controlled to move the work machine when a difference between the actual rotational speed and the target rotational speed is higher than or equal to a difference threshold and to generate the electric power when the difference between the actual rotational speed and the target rotational speed is lower than the difference threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF EMBODIMENTS

Figure 1:
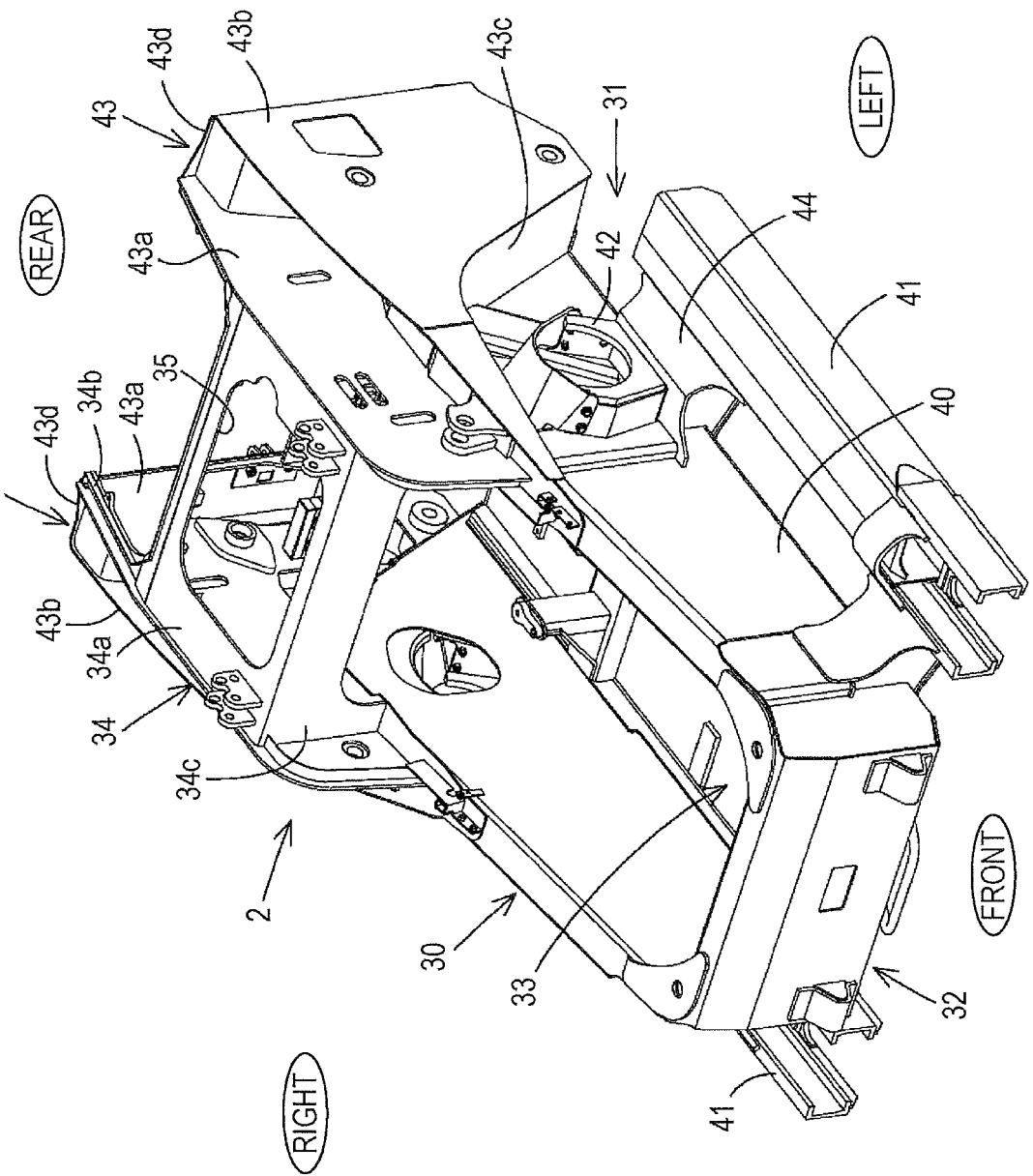
FIG. 1 is a perspective view of a machine body.

The embodiments will now be described with reference to the accompanying drawings, wherein like reference numerals designate corresponding or identical elements throughout the various drawings.

A work machine according to an embodiment of the present invention will now be described below with reference to the drawings.

Figure 10:
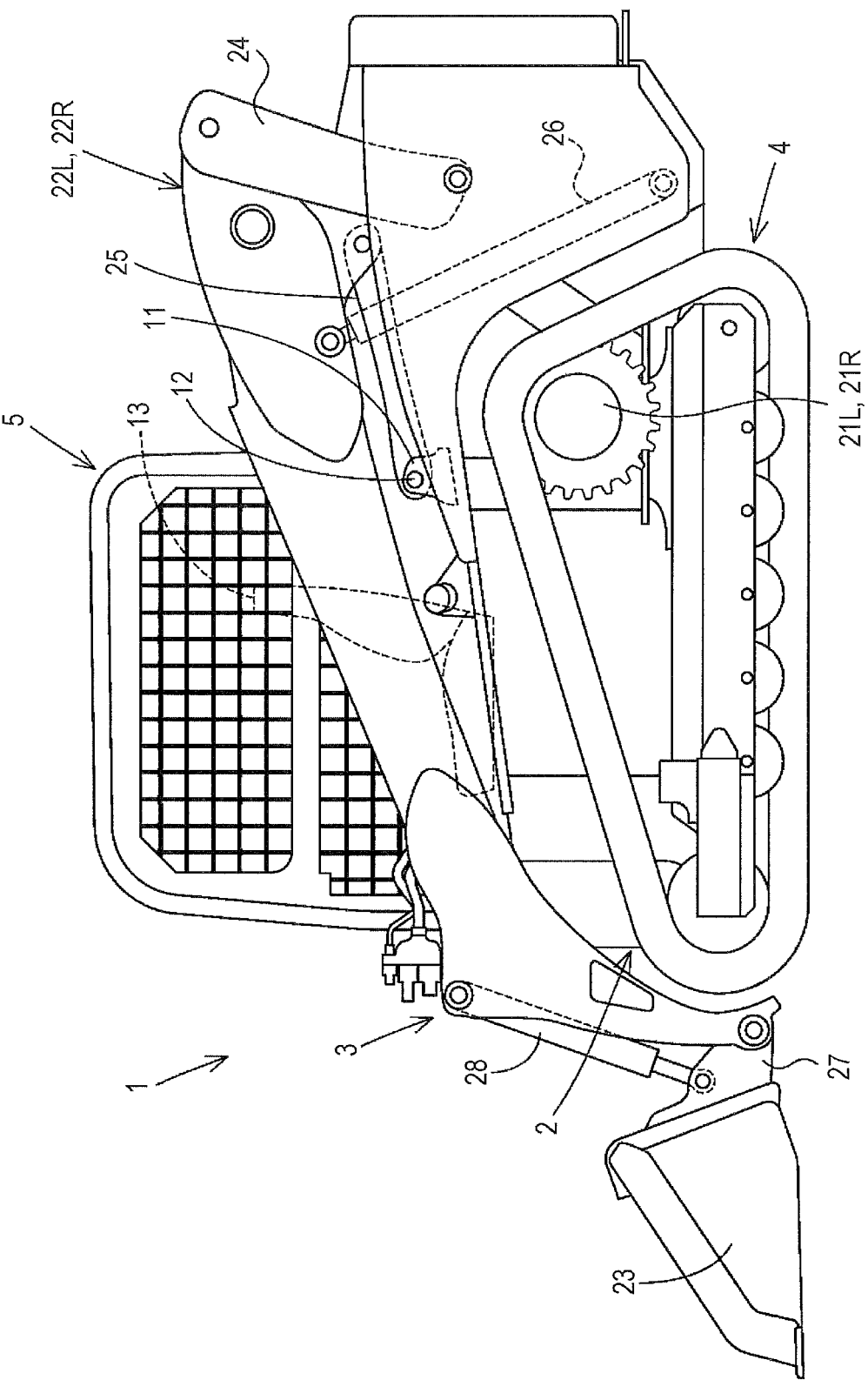
FIG. 10 is a side view of an entire work machine.

FIG. 10 is a side view of a work machine 1 according to the embodiment of the present invention. FIG. 10 shows a compact track loader as an exemplary work machine. The work machine according to the embodiment of the present invention is not limited to such a compact track loader, but examples thereof include a different type of a loader work machine such as a skid-steer loader. The examples thereof also include work machines other than the loader work machine.

The work machine 1 includes a machine body 2, a work implement 3 mounted to the machine body 2, and a travel device 4 supporting the machine body 2. In the embodiment of the present invention, assume that the front (the left in FIG. 10) of a driver on a driver's seat of the work machine is directed forward, the rear (the right in FIG. 10) of the driver is directed backward, the left (the near side in FIG. 10) of the driver is directed leftward, and the right (the far side in FIG. 10) of the driver is directed rightward. Furthermore, a direction perpendicular to the front and rear ends of the machine body is occasionally referred to as a machine body width direction (width direction).

The machine body 2 is mounted, in an upper front portion thereof, with a cabin 5. The cabin 5 has a rear portion supported by a bracket 11 of the machine body 2 so as to be swingable about a support shaft 12. The cabin 5 has a front portion that can be placed on the front portion of the machine body 2.

The cabin 5 is provided therein with a driver's seat 13. The driver's seat 13 is provided, on one side (e.g. the left) thereof, with a travel operation device configured to operate the travel device 4.

The travel device 4 is configured as a crawler travel device. The travel device 4 is provided on each of the left and the right of the machine body 2. The travel device 4 includes a first travel unit 21L and a second travel unit 21R configured to be actuated by hydraulic driving, and is configured to travel by means of the first travel unit 21L and the second travel unit 21R.

The work implement 3 includes a boom 22L, a boom 22R, and a bucket 23 (work tool) mounted at the distal ends of the booms 22L and 22R. The boom 22L is disposed on the left of the machine body 2. The boom 22R is disposed on the right of the machine body 2. The boom 22L and the boom 22R are coupled to each other via a coupling body. The boom 22L and the boom 22R are supported by a first lift link 24 and a second lift link 25. Provided between a proximal portion of each of the boom 22L and the boom 22R and the rear bottom of the machine body 2 is a lift cylinder 26 configured as a double-acting hydraulic cylinder. The lift cylinders 26 are simultaneously expanded and contracted to swing the boom 22L and the boom 22R upward and downward. The distal end of each of the boom 22L and the boom 22R pivotably supports an attachment bracket 27 so as to be rotatable about a transverse axis, and the rear surface of the bucket 23 is attached to each of the left and right attachment brackets 27.

Interposed between each of the attachment brackets 27 and a halfway portion adjacent to the distal end of each of the boom 22L and the boom 22R is a tilt cylinder 28 configured as a double-acting hydraulic cylinder. The bucket 23 swings (scoops and dumps) when the tilt cylinders 28 expand and contract.

The bucket 23 is detachably attached to the attachment brackets 27. Various tasks other than digging (or a different digging task) can be performed by detaching the bucket 23 and attaching various attachments (a hydraulically-driven work tool having a hydraulic actuator to be described later) to the attachment brackets 27.

The machine body will be described next.

As shown in FIG. 1, the machine body 2 has a right frame portion 30, a left frame portion 31, a front frame portion 32, a bottom frame portion 33, and a top frame portion 34.

The right frame portion 30 configures a right portion of the machine body 2. The left frame portion 31 configures a left portion of the machine body 2. The front frame portion 32 configures the front portion of the machine body 2, and couples front portions of the right frame portion 30 and the left frame portion 31. The bottom frame portion 33 configures the bottom of the machine body 2, and couples the bottoms of the right frame portion 30 and the left frame portion 31. The top frame portion 34 forms a rear top portion of the machine body 2, and couples rear top portions of the right frame portion 30 and the left frame portion 31.

The right frame portion 30 and the left frame portion 31 each include a main frame 40, a track frame 41, a motor attachment portion 42, and a frame 43. The track frame 41 is attached to a lower portion of an outer side surface of the main frame 40 via an attachment member 44. The motor attachment portion 42 is provided in a rear top portion of the outer side surface of the main frame 40. The frame 43 is attached to a rear portion of the main frame 40.

The frame 43 swingably supports the booms 22L and 22R, and the like. The frame 43 has inner walls 43a, outer walls 43b, a front wall 43c, and a rear wall 43d. Each of the inner walls 43a and a corresponding one of the outer walls 43b face each other with a space provided therebetween in the machine body width direction. The outer walls 43b are positioned outside the inner walls 43a of the machine body. The front wall 43c is provided in a halfway portion of the main frame 40 in the machine body width direction and thus projects inward as well as outward from the main frame 40 of the machine body. The front wall 43c has a portion projecting outward from the machine body and configuring a fender covering a rear portion of the travel device 4. The front wall 43c couples a front portion of each of the inner walls 43a and a front portion of a corresponding one of the outer walls 43b. The rear wall 43d couples a rear portion of each of the inner walls 43a and a rear portion of a corresponding one of the outer walls 43b.

The top frame portion 34 includes a first plate member 34a and second plate members 34b. The first plate member 34a couples an upper portion of the right inner wall 43a and an upper portion of the left inner wall 43a. The first plate member 34a has an annular edge configuring an opening 35 and is provided behind the cabin 5. The annular edge configuring the opening 35 has a substantially rectangular shape.

The second plate members 34b extend backward from the left rear end and the right rear end of the first plate member 34a. The left second plate member 34b extends backward along the left inner wall 43a, and has a machine body outer end coupled to the left inner wall 43a. The right second plate member 34b extends backward along the right inner wall 43a, and has a machine body outer end coupled to the right inner wall 43a. The left second plate member 34b and the right second plate member 34b are inclined downward toward the rear end. The top frame portion 34 has a third plate member 34c. The third plate member 34c extends downward from the front end of the first plate member 34a.

Figure 2:
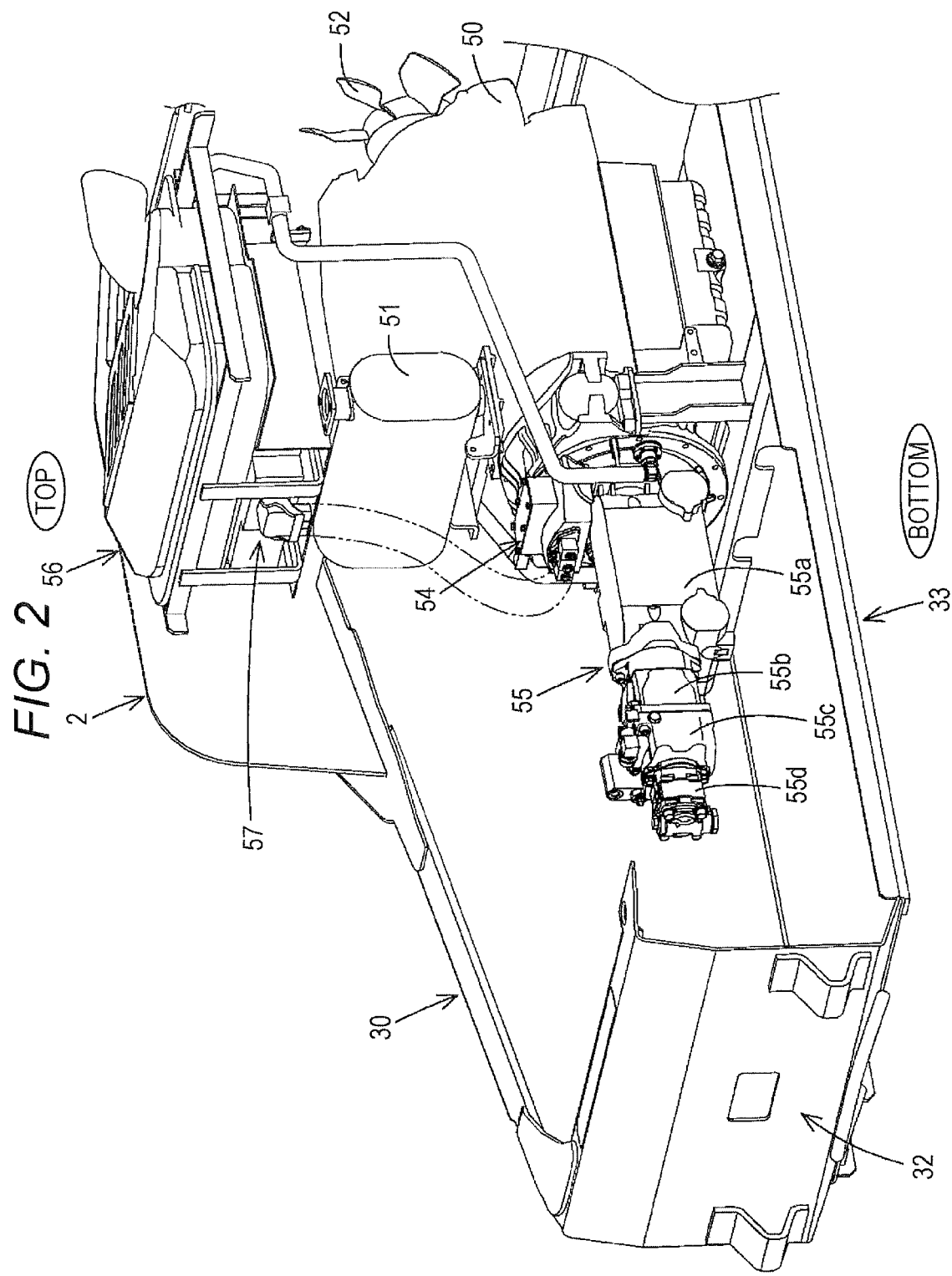
FIG. 2 is a perspective view of disposition of instruments (devices).
Figure 3:
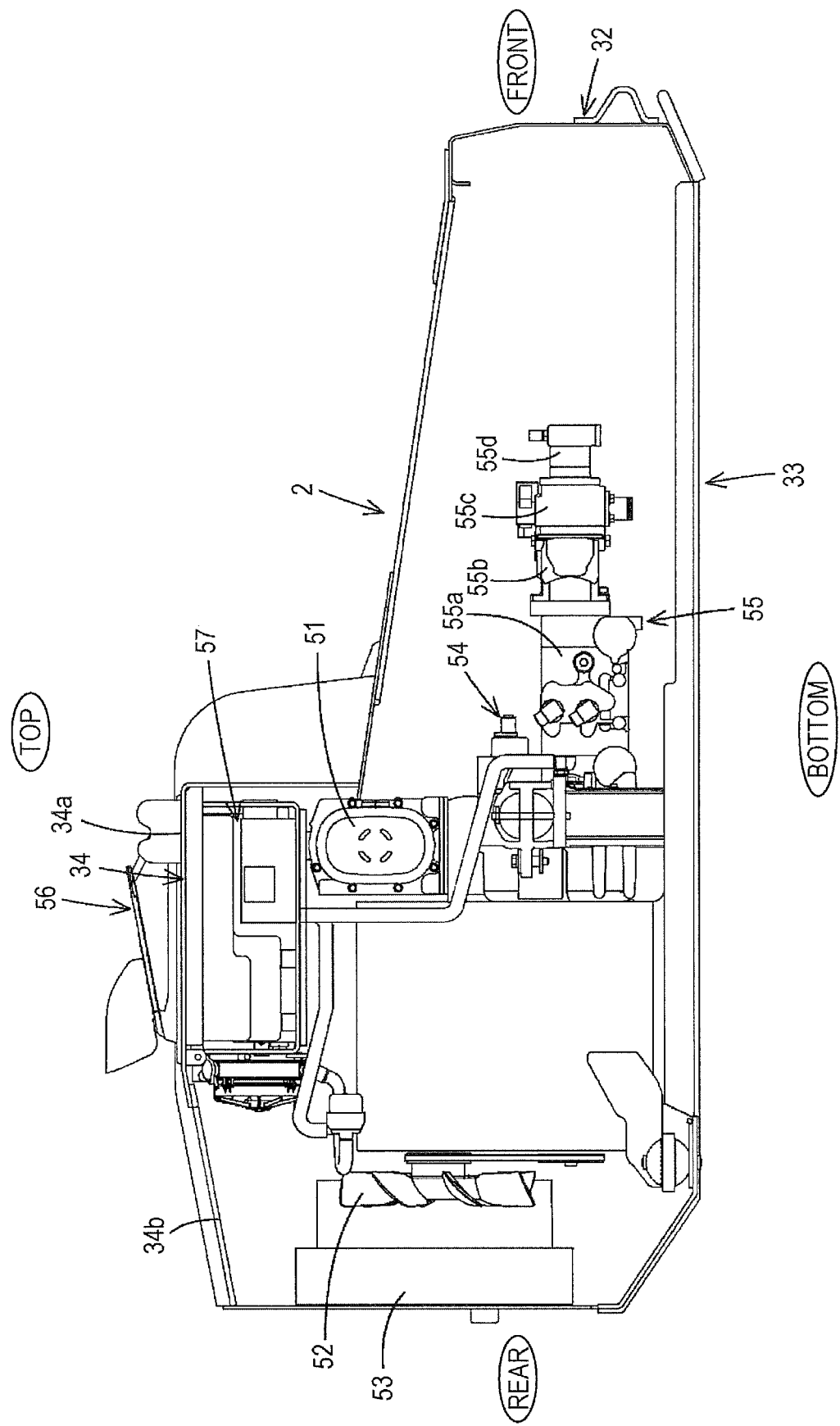
FIG. 3 is a right side view of the interior of the machine body.

As shown in FIGS. 2 and 3, the machine body 2 is provided with a diesel engine (engine) 50, a particulate removal device 51, a cooling fan 52, a radiator 53, a rotary electrical device 54, a driving device 55, and a battery 56.

The particulate removal device 51 is configured to capture minute particulates containing harmful substances in exhaust air (exhaust gas) from the engine 50, and is exemplified by a diesel particulate filter (DPF). The particulate removal device 51 is disposed at the upper front end of the engine 50, and is supported by a bracket of the engine 50. The particulate removal device 51 is configured to burn and remove minute particulates, and at least its internal temperature reaches 600° C. or more during burning. The cooling fan 52 is configured to be driven by the engine 50 to rotate. The cooling fan 52 is configured to rotate to generate an air flow from ahead to behind of the cooling fan 52 so as to cool the engine 50 with the air flow. The second radiator 53 is provided behind the cooling fan 52 and is configured to cool cooling water of the engine 50.

The rotary electrical device 54 is configured as a motor-generator. The rotary electrical device 54 is provided ahead of the engine 50.

The driving device 55 is configured to be driven by the engine 50 and/or the rotary electrical device 54 and output motive power mainly for work. Specifically, the driving device 55 is configured as a hydraulic device. The hydraulic device 55 includes a plurality of pumps configured to supply a hydraulic instrument mounted on the work machine with hydraulic oil. The hydraulic device 55 is provided ahead of the rotary electrical device 54. The plurality of pumps included in the hydraulic device 55 is exemplified by a first pump 55a, a second pump 55b, a third pump 55c, and a fourth pump 55d.

The first pump 55a is a hydraulic pump configuring part of a hydrostatic continuously variable transmission (HST). The second to fourth pumps 55b to 55d are each configured as a constant capacity gear pump. The second pump 55b is a hydraulic pump configured to drive a hydraulic actuator installed in the work implement 3 and a hydraulic actuator of a hydraulic attachment attached to the work implement 3. The third pump 55c is a hydraulic pump configured to increase hydraulic oil to be supplied to the hydraulic actuator. The fourth pump 55d is a hydraulic pump configured to supply pilot oil and supplement a hydraulic circuit of the HST with hydraulic oil.

The battery 56 functions as an electric storage configured to be charged with electric power or discharge electric power, and is embodied as a nickel-metal hydride secondary battery. Specifically, the battery 56 is configured to be charged with electric power generated by the rotary electrical device 54 and supply the rotary electrical device 54 and the like with the charged electric power. The battery 56 is provided adjacent to the engine 50 so as to receive heat generated by the engine 50. Specifically, the battery 56 is provided on the left of, on the right of, above, below, behind, or the like of the engine 50. The battery 56 according to the present embodiment is provided immediately above the engine 50. The battery 56 can be embodied as a lithium ion secondary battery or a capacitor.

The work machine 1 is configured to drive the hydraulic device 55 with motive power of the engine 50, drive the hydraulic device 55 with both the engine 50 and the rotary electrical device 54, and actuate the rotary electrical device 54 with motive power of the engine 50 to generate electric power. The work machine is configured to transmit motive power in accordance with a parallel hybrid system. Described below are motive power transmission structures of the engine 50 and the rotary electrical device 54.

Figure 4:
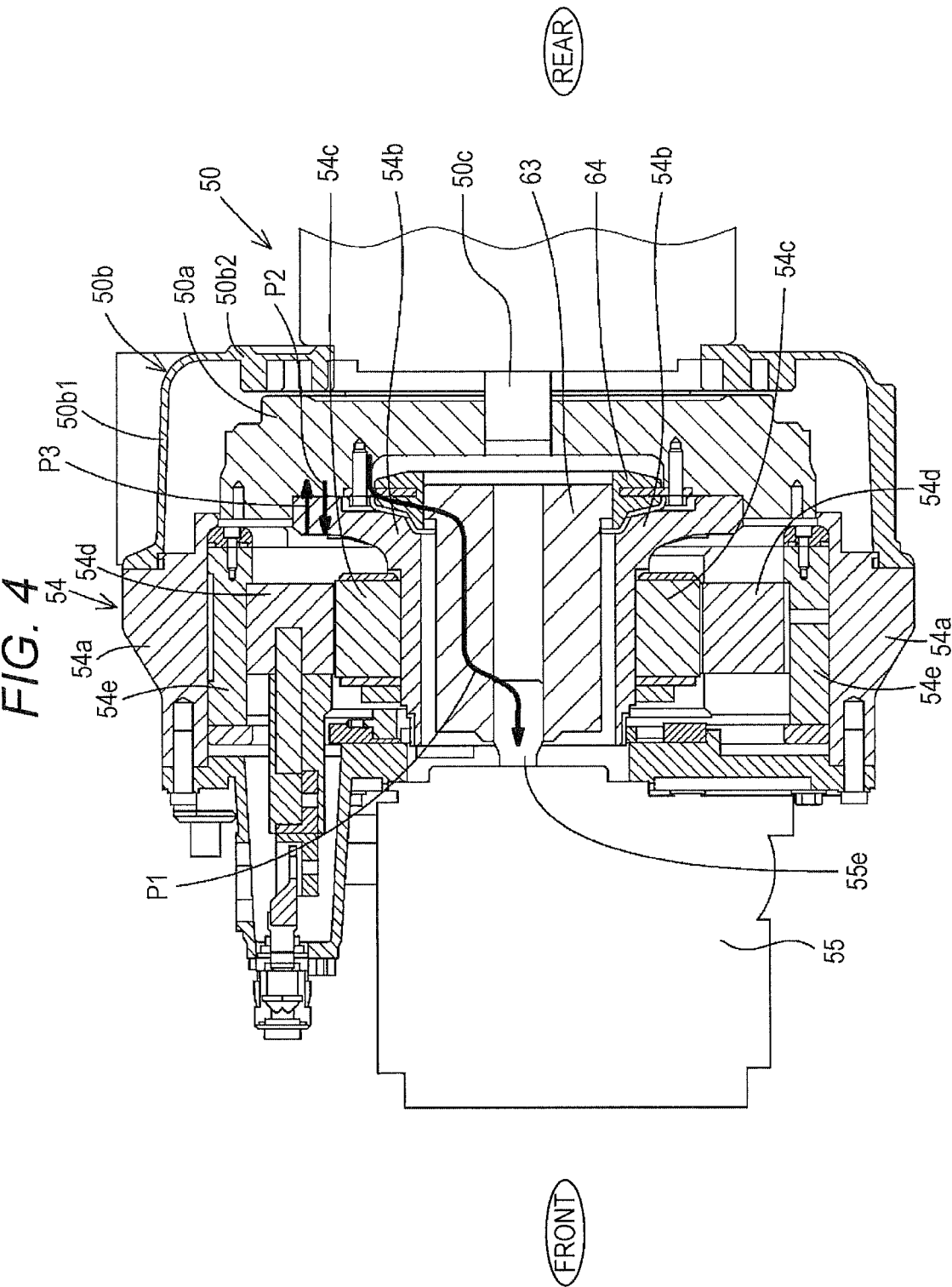
FIG. 4 is a sectional view of the interior of a rotary electrical device.

As shown in FIG. 4, the engine 50 is provided, in a front portion, with a flywheel housing 50b accommodating a flywheel 50a in a substantially circular disc shape. The flywheel housing 50b has an outer peripheral portion 50b1 covering the outer circumference of the flywheel 50a, and a side wall 50b2 covering a rear portion of the flywheel 50a and fixed to the engine 50. The side wall 50b2 is provided, on the opposite portion (front portion), with a housing 54a that is attached to the outer peripheral portion 50b1. The rear portion of the flywheel 50a is coupled with a crank shaft 50c of the engine 50.

The rotary electrical device 54 is configured as a motor-generator that is driven in a manner of a three-phase AC synchronous motor of a permanent magnet embedded type.

The rotary electrical device 54 includes the housing 54a, a coupling portion 54b coupled to the flywheel 50a, a rotor 54c fixed to the coupling portion 54b, a stator 54d provided to the rotor 54c, and a water jacket 54e provided outside the stator 54d.

The coupling portion 54b has a tubular shape and a rear end attached to the flywheel 50a. The coupling portion 54b is provided therein with an intermediate shaft 63. The intermediate shaft 63 has a rear end provided with a coupling member 64 that has an exterior connected to the flywheel 50a. The intermediate shaft 63 has a front end connected with a drive shaft 55e of the hydraulic device 55.

When the engine 50 is driven, rotary motive power of the crank shaft 50c of the engine 50 is transmitted to the flywheel 50a to rotate the flywheel 50a. As indicated by arrow P1 in FIG. 4, rotary motive power of the flywheel 50a is transmitted from the coupling member 64 to the intermediate shaft 63 and is then transmitted from the intermediate shaft 63 to the drive shaft 55e of the hydraulic device 55 so as to drive the hydraulic device 55.

As indicated by arrow P2 in FIG. 4, rotary motive power of the flywheel 50a is transmitted to the rotor 54c by way of the coupling portion 54b. Rotary motive power of the engine 50 is thus transmitted to the rotor 54c (coupling portion 54b) to actuate the rotary electrical device 54 as a generator. Electric power stored in the battery 56 is supplied to the stator 54d to rotate the rotor 54c. As indicated by arrow P3 in FIG. 4, rotary motive power of the rotor 54c can be transmitted to the flywheel 50a by way of the coupling portion 54b. The rotary electrical device 54 can thus be actuated as a motor to assist the engine 50.

Described next is control of the rotary electrical device (motor-generator) 54.

Figure 5:
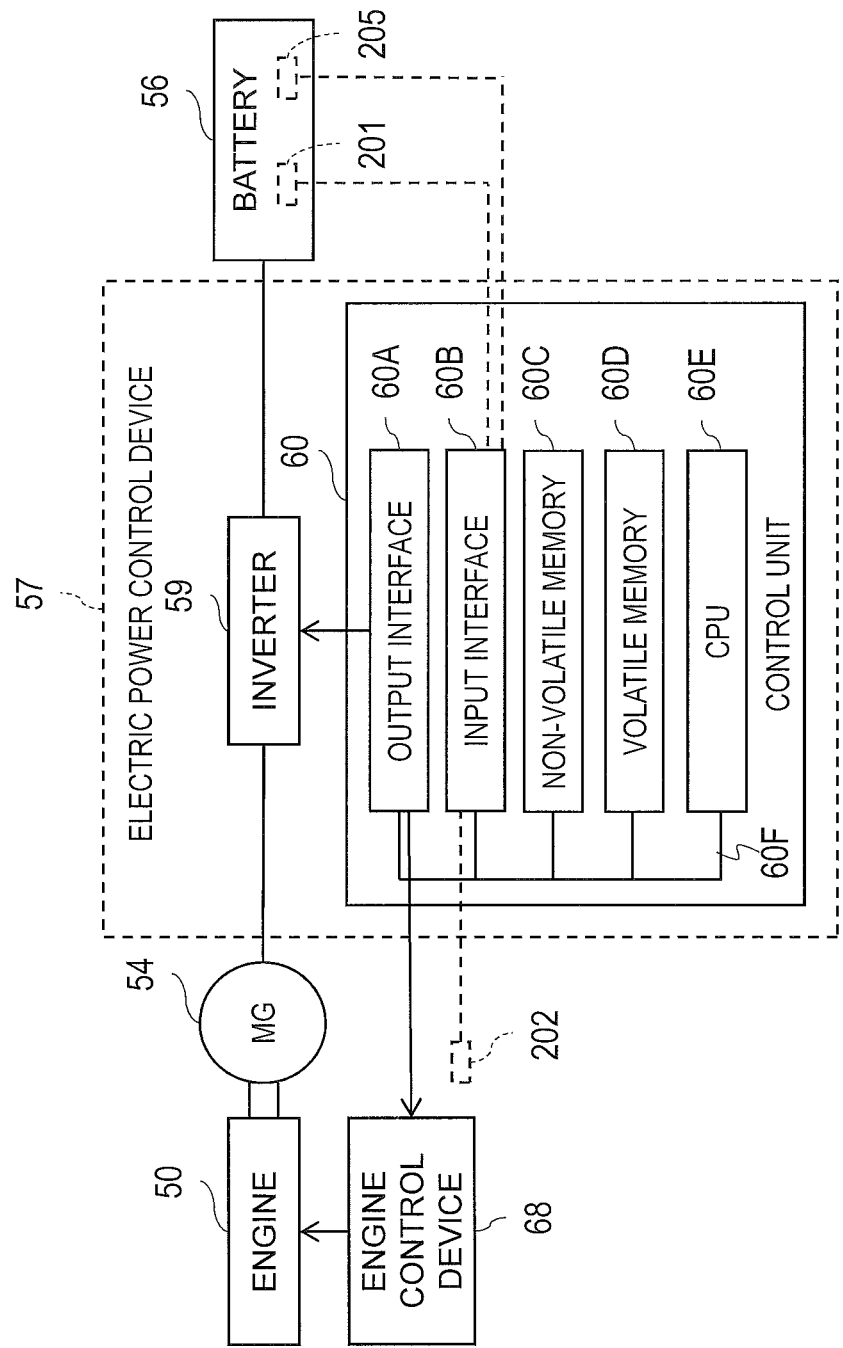
FIG. 5 is a control block diagram of the rotary electrical device.

As shown in FIG. 5, the rotary electrical device 54 is connected to an electric power control device (control device, circuitry) 57. The electric power control device 57 is configured to control actuation of the rotary electrical device 54. For example, the electric power control device 57 actuates the rotary electrical device 54 as a motor, or actuates the rotary electrical device 54 as a generator, as described above. For easier description, operation of the rotary electrical device 54 actuated as a motor and operation of the rotary electrical device 54 actuated as a generator will hereinafter be referred to as "first operation" and "second operation", respectively. The electric power control device 57 according to the present embodiment sets the first operation or the second operation in accordance with a stored power level of the battery 56.

The electric power control device (control device) 57 will be described in detail below in terms of its configuration and control operation.

The control device 57 includes an inverter 59 and a control unit 60. The control device 57 is connected with a stored power measurement device 201 (a power detector 201) configured to detect a stored power level (a charge level) of the battery 56, in other words, a remaining power level stored in the battery 56. The inverter 59 includes a plurality of switching elements or the like, and converts DC power to AC power in accordance with switching of the switching elements. The inverter 59 is connected to the rotary electrical device 54 and the battery 56.

The control unit 60 includes electric/electronic components. The electric/electronic components include an output interface 60A, an input interface 60B, a non-volatile memory 60C, and a volatile memory 60D, a CPU 60E, and the like. The CPU 60E is connected to each of the output interface 60A, the input interface 60B, the non-volatile memory 60C, and the volatile memory 60D via a system bus 60F, for example. The control unit 60 controls the inverter 59 to set the first operation or the second operation by transmitting a control signal via the output interface 60A. The output interface 60A is a communication interface between the control unit 60 and each of the inverter 5 and an engine control device 68. The engine control device 68 controls a rotational speed of the engine 50. The control unit 60 transmits a control signal to the engine control device 68 via the output interface 60A to control the rotational speed of the engine 50. The input interface 60B is a communication interface between the control unit 60 and each of the stored power measurement device 201, a power storage setting switch 202, and a temperature measurement device 205. The control unit 60 can receive the charge level of the battery 56 via the input interface 60B. A non-volatile memory 60C stores programs which is executed by the CPU 60E and data to be used in the programs. The non-volatile memory 60C includes a ROM, a flash memory, and a magnetic storage like a hard disk, for example. The volatile memory 60D is used when the CPU 60E executes the programs stored in the non-volatile memory 60C. Specifically, the control unit 60 (control device 57) sets the first operation if the stored power level detected by the stored power measurement device 201 is higher than or equal to a predetermined power storage threshold (a charge level threshold). For example, the non-volatile memory 60C stores the charge level threshold and a program to determine whether the charge level of the battery 56 is higher than or equal to the charge level threshold and to send a control signal to the inverter 59 via the output interface 60A if it is determined that the charge level of the battery 56 is higher than or equal to the charge level threshold. The power storage threshold (the charge level threshold) is set in a highly charged region in consideration of deterioration restraint of the battery 56. The power storage threshold (the charge level threshold) is exemplarily set to 90% of the maximum stored power level (called maximum capacity) of the battery 56.

In an exemplary state where the work machine 1 is driven by the engine 50 and the stored power level is higher than or equal to 90% of the maximum capacity of the battery, the control unit 60 sets the first operation and actuates the rotary electrical device 54 as a motor for assist of the engine 50. In other words, when the stored power level is higher than or equal to 90% of the maximum capacity, the hydraulic device 55 can be driven by motive power of both the engine 50 and the rotary electrical device 54. In contrast, if the stored power level detected by the stored power measurement device 201 is lower than the power storage threshold (lower than 90%), the control unit 60 sets the second operation and actuates the rotary electrical device 54 as a generator for power generation. In other words, when the stored power level is lower than 90% of the maximum capacity, the hydraulic device 55 can be driven by motive power of the engine 50 and the battery 56 can store electric power generated by the rotary electrical device 54.

As described above, the control device 57 (control unit 60) sets the first operation if the stored power level of the battery 56 is higher than or equal to the predetermined power storage threshold, and sets the second operation if the stored power level is lower than the power storage threshold. The stored power level of the battery 56 can thus remain in the highly charged region and the battery 56 can be charged and discharge repeatedly within the highly charged region, even under a condition where the rotary electrical device 54 is actuated as a motor. Deterioration of the battery 56 can thus be restrained even in the parallel hybrid system enabling assist of the engine 50 and power generation (charge).

The power storage threshold is preliminarily set in the above embodiment. The power storage threshold can alternatively be changed. The control unit 60 is provided with a power storage setting switch 202 (a threshold setting switch 202) configured to set a power storage threshold. The control unit 60 receives through the input interface 60B, a threshold information regarding the charge level threshold which is inputted via the power storage setting switch 202. The power storage setting switch 202 is provided adjacent to the driver's seat 13 to allow operation by an operator on the driver's seat 13.

Change in power storage threshold by the power storage setting switch 202 thus enables change between a region of assist by the rotary electrical device 54 and a region of power generation (charge) by the rotary electrical device 54. For example, the battery 56 can be charged actively at a low stored power level and the rotary electrical device 54 can assist positively at a high stored power level. An operator operates the power storage setting switch 202 in accordance with a task of the work machine 1 to appropriately set timing and the like of assist by the rotary electrical device 54 in accordance with the task of the work machine 1 and improve workability of the work machine 1.

The control device 57 (control unit 60) according to the above embodiment sets the first operation or the second operation in accordance with a stored power level of the battery 56. The control device 57 (control unit 60) can additionally be configured to set the first operation or the second operation in accordance with a temperature of the battery. The control device 57 (control unit 60) is connected with the temperature measurement device 205 (the temperature detector 205) configured to detect temperature of the battery 56 (a battery temperature).

The control unit 60 sets the first operation if the stored power level is higher than or equal to the power storage threshold and a battery temperature detected by the temperature measurement device 205 is within a predetermined temperature range. In this case, the program further determines whether the battery temperature is within the temperature range. The control unit 60 sets third operation including neither the first operation nor the second operation if the battery temperature is out of the temperature range while the work machine 1 is performing the first operation or the second operation. More specifically, if it is determined that the battery temperature is out of the temperature range, the control unit 60 outputs a control signal to the inverter 59 to perform neither the first operation nor the second operation.

Specifically, the control unit 60 sets the first operation if the stored power level is higher than or equal to 90% of the maximum capacity and the battery temperature is within a temperature range from −10° C. to 55° C. Thresholds of the temperature range can be stored in the non-volatile memory 60C. In other words, if the stored power level is higher than or equal to the power storage threshold and the battery temperature is within the temperature range, the control unit 60 actuates the rotary electrical device 54 as a motor for assist of the engine 50.

In contrast, if the battery temperature is lower than −10° C. or higher than or equal to 55° C. and is out of the temperature range, the control unit 60 sets the third operation and the hydraulic device 55 is actuated only by motive power of the engine 50. The control unit 60 actuates the rotary electrical device 54 as a generator for power generation if the battery temperature is within the temperature range. Within the temperature range allowing the battery 56 to function, the rotary electrical device 54 is provided with electric power to be actuated as a motor so as to adequately assist the engine 50. The battery neither discharges nor is charged at the battery temperature out of the temperature range, to prevent deterioration of the battery 56 due to the temperature change and prolong the life of the battery 56.

Second Embodiment

Figure 6:
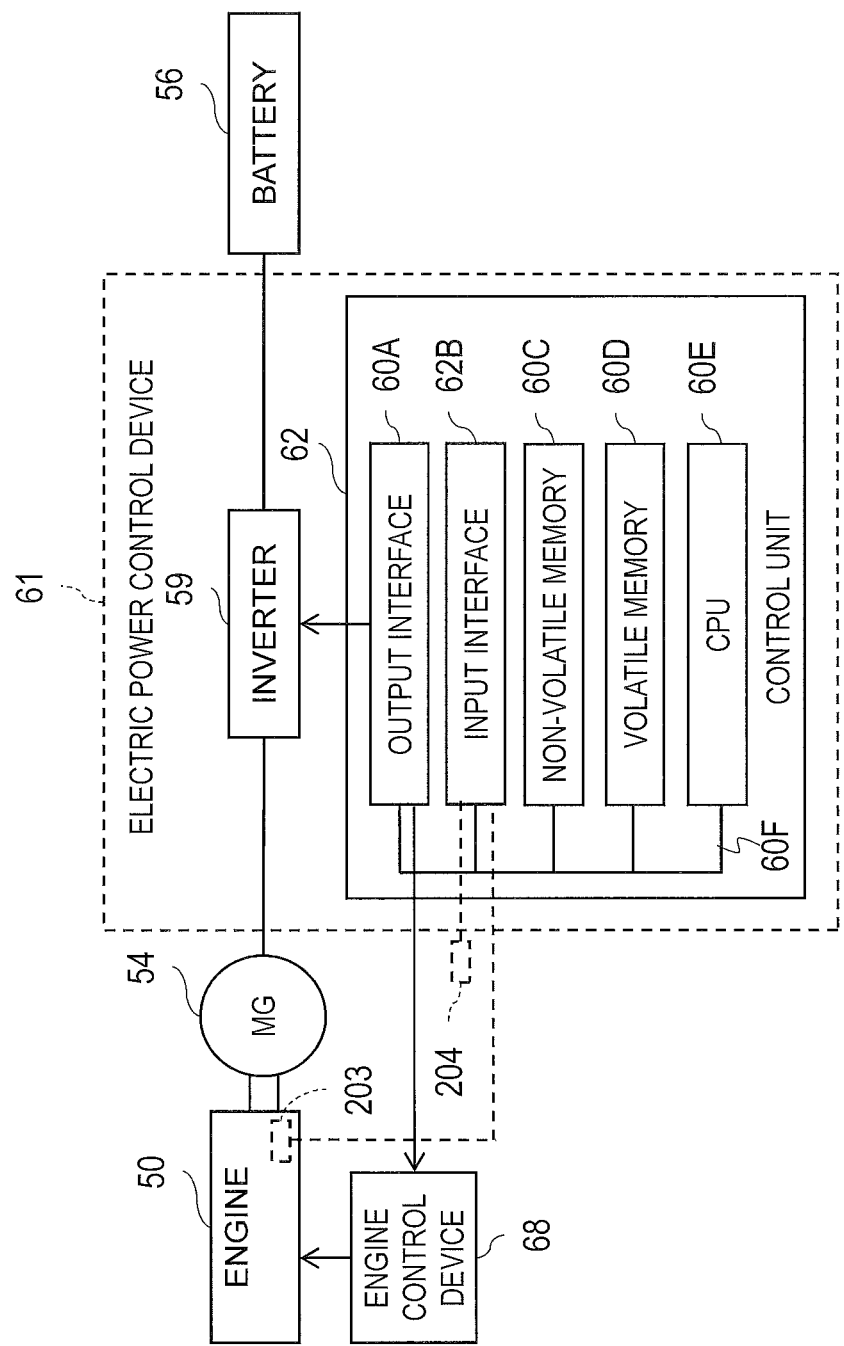
FIG. 6 is a control block diagram of a rotary electrical device according to a second embodiment.

FIG. 6 is a control block diagram according to the second embodiment. Configurations similar to those according to the first embodiment will not be described repeatedly.

As shown in FIG. 6, the rotary electrical device 54 is connected to an electric power control device (control device, circuitry) 61. Like as the electric power control device 57, the electric power control device 61 is configured to control actuation of the rotary electrical device 54. In FIG. 6, elements in the electrical power control device 61 which are substantially the same as those in the electrical power control device 57 will be numbered the same here, and will not be described and/or illustrated again in detail here for the sake of brevity. For example, the electric power control device 61 causes the rotary electrical device 54 to perform the first operation or the second operation. The electric power control device 61 according to the present embodiment sets the first operation or the second operation in accordance with a rotational speed of the engine. The control device 61 includes the inverter 59 and a control unit 62. The inverter 59 is configured similar to the inverter according to the above embodiment.

The control device 61 is connected with an actual rotational speed measurement device 203 (an actual rotational speed detector 203) configured to detect an actual rotational speed of the engine. The control unit 62 includes an electric/electronic component such as an input interface 62B, a CPU 60E, and the like. The input interface 62B is a communication interface between the control unit 62 and each of the actual rotational speed measurement device 203 and a rotational speed setting switch 204. The control unit 62 controls the inverter 59 to set the first operation or the second operation.

Figure 7:
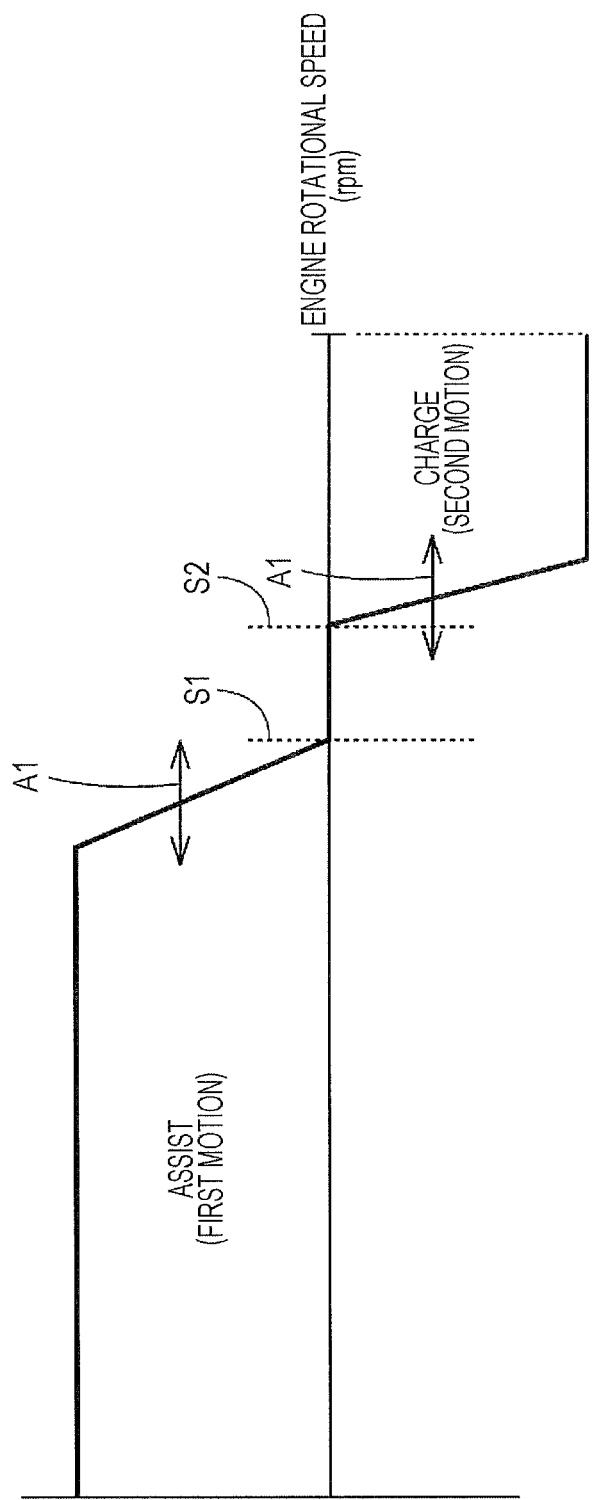
FIG. 7 is a graph indicating a relation among an engine rotational speed, first operation (variable assist), second operation (variable charge), a first set value, and a second set value.

FIG. 7 is a graph indicating a relation among an engine rotational speed, the first operation, the second operation, a first set value, and a second set value. FIG. 7 includes a transverse axis for a low engine rotational speed indicated on the left and a high engine rotational speed indicated on the right, so that an engine rotational speed gradually increases from the left to the right. FIG. 7 includes arrow A1 indicating change between the first operation (variable assist) and the second operation (variable charge), as to be described later.

As indicated in FIG. 7, the control unit 62 (control device 61) sets the first operation if an actual rotational speed detected by the actual rotational speed measurement device 203 is lower than or equal to a predetermined set value (first set value) S1. If an actual rotational speed exceeds the predetermined set value (first set value) S1, specifically, if an actual rotational speed is higher than or equal to a second set value S2 determined separately from the first set value S1, the control unit 62 sets the second operation. The control unit 62 sores the first set value S1 and the second set value S2.

In an exemplary case where the first set value S1 is 2300 rpm and the second set value is 2350 rpm, the control unit 62 sets the first operation, actuates the rotary electrical device 54 as a motor for assist of the engine 50 when an actual rotational speed becomes lower than or equal to 2300 rpm. In contrast, when an actual rotational speed exceeds 2300 rpm and becomes higher than or equal to 2350 rpm, the control unit 62 sets the second operation and actuates the rotary electrical device 54 as a generator for power generation.

As described above, the control device 61 (control unit 62) sets the first operation if an actual rotational speed is lower than or equal to the first set value S1, and sets the second operation if an actual rotational speed is higher than or equal to the second set value S2. If an actual rotational speed exceeds the first set value S1 and is lower than the second set value S2 (S1<R<S2; R denoting an actual rotational speed), the control unit 62 sets the third operation including neither the first operation nor the second operation. More specifically, the program further determines whether the actual rotational speed is lower than or equal to the first set value S1 and whether the actual rotational speed is higher than or equal to the second set value S2. If it is determined that the actual rotational speed is lower than or equal to the first set value S1, the control unit 62 outputs a control signal to the inverter 59 to perform the first operation. If it is determined that the actual rotational speed is higher than or equal to the second set value S2, the control unit 62 outputs a control signal to the inverter 59 to perform the second operation. If the actual rotational speed exceeds the first set value S1 and is lower than the second set value S2, the control unit 62 outputs a control signal to the inverter 59 to perform neither the first operation nor the second operation.

The rotary electrical device 54 can thus be actuated as a motor to assist the engine 50 in an exemplary case where an actual rotational speed of the engine 50 is decreased by a load applied to the work machine in operation. The engine 50 can be assisted also in a case where the work machine operates at an actual rotational speed of the engine 50 set to a low value. The rotary electrical device 54 can be actuated as a generator to charge electric power to the battery 56 in a state where no load is applied to the work machine in operation. Assist and power generation (charge) are performed in accordance with an engine rotational speed in these manners. Even a work machine adopting the parallel hybrid system can thus switch between assist and power generation (charge) with no loss of operability (workability) of the work machine 1 by the hydraulic device 55 or the like.

The set values (the first set value S1 and the second set value S2) according to the above embodiment are preliminarily determined and stored in the non-volatile memory 60C. The set values (the first set value S1 and the second set value S2) can alternatively be changeable. Specifically, the first set value S1 and the second set value S2 can be changed to change a region of the first operation and a region of the second operation. In this case, the control device 61 (control unit 62) can perform variable assist by region change of the first operation and variable charge by region change of the second operation.

As shown in FIG. 6, the control device 61 (control unit 62) is connected via the input interface 62B with the rotational speed setting switch 204 (a rotational speed threshold setting interface 204) configured to set an engine rotational speed threshold, that is, the first set value S1 and the second set value S2. The rotational speed setting switch 204 is provided adjacent to the driver's seat 13 to allow operation by an operator on the driver's seat 13. The rotational speed setting switch 204 includes two dials or the like. The first set value S1 and the second set value S2 are set by turning the dials. The rotational speed setting switch 204 is not limitedly configured by the dials.

As indicated by the arrow A1 in FIG. 7, the first set value S1 and the second set value S2 are changed appropriately by the rotational speed setting switch 204 to change the region of assist (variable assist) by the rotary electrical device 54 and the region of power generation (variable charge) by the rotary electrical device 54. In an exemplary case where the first set value S1 and the second set value S2 are set appropriately, the rotary electrical device 54 can actively assist at a low engine rotational speed and can actively charge the battery 56 at a high engine rotational speed.

The rotational speed setting switch 204 can alternatively be configured to automatically set the second set value S2 upon setting the first set value S1. Specifically, the second set value S2 can be set simultaneously with setting of the first set value S1 by preliminarily setting a difference between the first set value S1 and the second set value S2. The rotational speed setting switch 204 can further alternatively be configured to automatically set the first set value S1 upon setting the second set value S2. Such configurations allow the rotational speed setting switch 204 configured by a single dial or the like to set the two set values.

Figure 8:
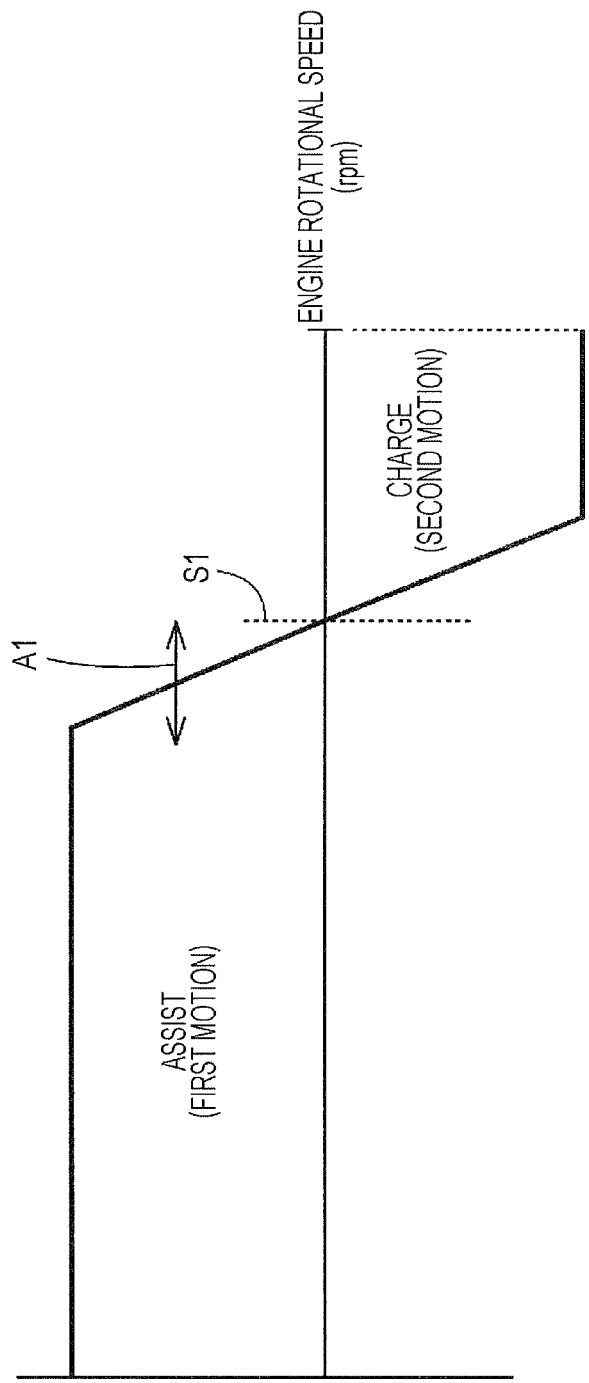
FIG. 8 is a graph indicating a relation among the engine rotational speed, the first operation (variable assist), the second operation (variable charge), and the first set value.

The rotational speed setting switch 204 according to the above embodiment is configured to set the two set values (the first set value S1 and the second set value S2). The rotational speed setting switch 204 can alternatively be configured to change one of the set values. As exemplified in FIG. 8, the control unit 62 (control device 61) sets the first operation if an actual rotational speed is lower than or equal to the first set value S1, and sets the second operation if an actual rotational speed exceeds the first set value S1. Appropriate change of the first set value S1 by the rotational speed setting switch 204 thus enables change between the region of assist by the rotary electrical device 54 and the region of power generation (charge) by the rotary electrical device 54.

Third Embodiment

Figure 9:
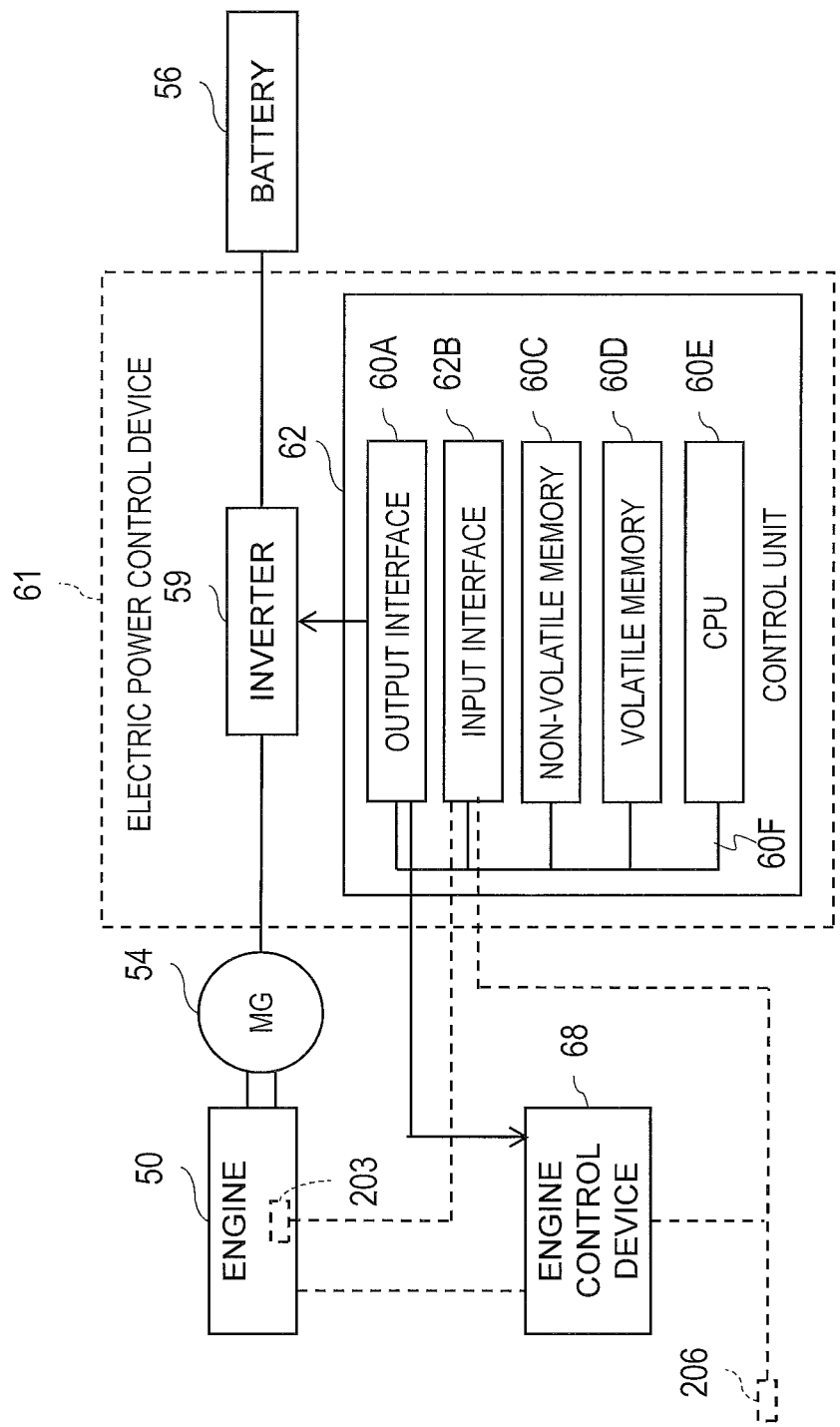
FIG. 9 is a control block diagram of a rotary electrical device according to a third embodiment.

FIG. 9 is a control block diagram according to the third embodiment. Configurations similar to those according to the first or second embodiment will not be described repeatedly.

As shown in FIG. 9, the work machine is connected with a rotational speed setting switch 206 (a target rotational speed setting interface 206) via which a target engine rotational speed is set. The rotational speed setting switch 206 sets a set value serving as a target value of the engine rotational speed. In other words, the rotational speed setting switch 206 according to the third embodiment is configured to set a target engine rotational speed.

The target engine rotational speed set by the rotational speed setting switch 206 is transmitted to an engine control device 68 configured to control the engine 50 and to the control device 61 (control unit 62). An actual rotational speed detected by the actual rotational speed measurement device 203 is transmitted to the engine control device 68. The engine control device 68 controls a rotational speed of the engine 50 so that an actual rotational speed of the engine becomes equal to the target rotational speed set by the rotational speed setting switch 206.

The control device 61 (control unit 62) monitors a difference between an actual rotational speed detected by the actual rotational speed measurement device 203 and the target rotational speed set by the rotational speed setting switch 206. The control unit 62 sets the first operation if the difference between the actual rotational speed and the target rotational speed is higher than or equal to a predetermined value (a difference threshold), which can be stored in the non-volatile memory 60C. The control unit 62 sets the second operation if the difference between the actual rotational speed and the target rotational speed is lower than the predetermined value. In an exemplary case where the difference between the actual rotational speed and the target rotational speed is higher than or equal to 500 rpm, the control unit 62 sets the first operation for assist of the engine 50. In another case where the difference between the actual rotational speed and the target rotational speed is lower than 500 rpm, the control unit 62 sets the second operation for power generation (charge). The region of assist is changed in accordance with the difference between the actual rotational speed and the target rotational speed, to select charge if the engine 50 in the operating work machine is not in full operation and the difference between the rotational speed and the target rotational speed is small, and to select assist if a load is applied to the engine 50 in the operating work machine and the difference between the rotational speed and the target rotational speed is large. The work machine can thus perform a task in accordance with motive power of the engine 50 and the rotary electrical device 54.

The embodiments of the present invention have been described above. The embodiments disclosed herein should be regarded as not restrictive but exemplary in all aspects. The scope of the present invention is defined not by the above description but by the claims, and is intended to include meanings equivalent to the claims and all the modifications within the scope.

The control unit 60 or 62 can have an assist stressed mode (power mode) and a charge stressed mode (ecological mode). The power mode and the ecological mode are each configured by a program or the like stored in the control unit 60 or 62. The control unit 60 or 62 is connected with a switch configured to switch between the power mode and the ecological mode. An operator operates the switch to set the control unit 60 or 62 into the power mode or the ecological mode.

In an exemplary case where the control unit 60 is set into the power mode, the power storage threshold in the power mode is set to 90%. In another case where the control unit 60 is set into the ecological mode, the power storage threshold in the ecological mode is set to 50%. In the case where the control unit 60 is set into the power mode or the ecological mode, the power storage threshold can be set by operating the switch. The rotary electrical device 54 can assist actively in the power mode or can charge actively in the ecological mode. The power storage thresholds in the power mode and the ecological mode are not limited to those described above.

Alternatively, in a case where the control unit 62 is set into the power mode, the first set value in the power mode is set to 80% of the maximum engine rotational speed. In another case where the control unit 62 is set into the ecological mode, the first set value in the ecological mode is set to 50% of the maximum engine rotational speed. In these manners, when the control unit 62 is set into the power mode or the ecological mode, the set value (first set value) can be set by operating the switch. The rotary electrical device 54 can assist actively in the power mode or can charge actively in the ecological mode. The set values in the power mode and the ecological mode are not limited to those described above.

Obviously, numerous modifications and variations of the present invention are possible in light of the above teachings. It is therefore to be understood that within the scope of the appended claims, the invention may be practiced otherwise than as specifically described herein.

What is claimed is:

1. A work machine comprising:
   an engine to move the work machine;
   a motor-generator to move the work machine and to generate electric power;
   an actual rotational speed detector to detect an actual rotational speed of the engine; and
   circuitry configured to control the motor-generator to move the work machine when the actual rotational speed is lower than or equal to a first rotational speed threshold and to generate the electric power when the actual rotational speed exceeds a second rotational speed threshold which is larger than or equal to the first rotational speed threshold.

2. The work machine according to claim 1, wherein the motor-generator is to generate electric power by being driven by the engine.

3. The work machine according to claim 1, further comprising:
   a driving device to be actuated by at least one of the engine and the motor-generator.

4. The work machine according to claim 1, further comprising:
   a rotational speed threshold setting interface via which the first rotational speed threshold and the second rotational speed threshold are set.

5. A work machine comprising:
   an engine to move the work machine;
   a motor-generator to move the work machine and to generate electric power;
   a target rotational speed setting interface via which a target rotational speed of the engine is set; and
   an actual rotational speed detector to detect an actual rotational speed of the engine; and
   circuitry configured to control the motor-generator to move the work machine when a difference between the actual rotational speed and the target rotational speed is higher than or equal to a difference threshold, and to generate the electric power when the difference between the actual rotational speed and the target rotational speed is lower than the difference threshold.

6. A method for controlling a work machine, comprising:
   controlling an engine to move the work machine;
   detecting an actual rotational speed of the engine; and
   controlling a motor-generator to move the work machine when the actual rotational speed is lower than or equal to a first rotational speed threshold and to generate the electric power when the actual rotational speed exceeds a second rotational speed threshold which is larger than or equal to the first rotational speed threshold.

7. A method for controlling a work machine, comprising:
   controlling an engine to move the work machine;
   setting a target rotational speed of the engine;
   detecting an actual rotational speed of the engine; and
   controlling a motor-generator to move the work machine when a difference between the actual rotational speed and the target rotational speed is higher than or equal to a difference threshold and to generate the electric power when the difference between the actual rotational speed and the target rotational speed is lower than the difference threshold.

* * * * *